(12) United States Patent
Leonard

(10) Patent No.: US 10,258,030 B1
(45) Date of Patent: Apr. 16, 2019

(54) DECOY ANCHOR SYSTEM

(71) Applicant: Kenneth Shane Leonard, Braggs, OK (US)

(72) Inventor: Kenneth Shane Leonard, Braggs, OK (US)

( * ) Notice: Subject to any disclaimer, the term of this patent is extended or adjusted under 35 U.S.C. 154(b) by 0 days.

(21) Appl. No.: 16/205,498

(22) Filed: Nov. 30, 2018

(51) Int. Cl.
*A01M 31/06* (2006.01)

(52) U.S. Cl.
CPC .................................. *A01M 31/06* (2013.01)

(58) Field of Classification Search
CPC ............................... A01M 31/06; A63H 23/02
USPC .................................................. 43/3; 446/160
See application file for complete search history.

(56) References Cited

U.S. PATENT DOCUMENTS

| | | | | |
|---|---|---|---|---|
| 244,038 A * | 7/1881 | Danz | A01M 31/06 43/3 |
| 1,258,862 A * | 3/1918 | Bloom | A63H 23/02 446/161 |
| 1,608,045 A * | 11/1926 | Stallman | A01M 31/06 43/3 |
| 1,887,491 A * | 11/1932 | Johnson | A01M 31/06 119/714 |
| 2,430,645 A * | 11/1947 | Mills | A01M 31/06 43/3 |
| 2,536,736 A * | 1/1951 | Gazalski | F24F 11/89 43/3 |
| 2,630,093 A * | 3/1953 | Toal | A01M 31/06 114/294 |
| 2,678,778 A * | 5/1954 | Gibson | A01M 31/06 242/125.2 |
| 2,709,866 A * | 6/1955 | Stumvoll | A01M 31/06 43/3 |
| 2,747,315 A * | 5/1956 | Clemas | A01M 31/06 43/3 |
| 2,747,316 A * | 5/1956 | Benedetto | A01M 31/06 43/3 |
| 2,929,165 A * | 3/1960 | Rees | A01M 31/06 43/3 |
| 3,149,433 A * | 9/1964 | Hagen | A01M 31/06 43/3 |
| 3,172,223 A * | 3/1965 | Stager | A01M 31/06 43/2 |
| 3,408,763 A * | 11/1968 | Rudolph | A01M 31/06 43/3 |
| 3,930,328 A * | 1/1976 | Knuth | A01M 31/06 43/3 |
| 4,689,032 A * | 8/1987 | Trossman | A63H 23/10 114/296 |
| 5,461,816 A * | 10/1995 | Gazalski | A01M 31/06 43/3 |

(Continued)

*Primary Examiner* — Magdalena Topolski
(74) *Attorney, Agent, or Firm* — Dale J. Ream

(57) ABSTRACT

Systems and methods for anchoring a decoy are disclosed. A decoy anchor system has a floating decoy and a tether. The decoy anchor system has a first fastener attached to the floating decoy and a second fastener movably coupled to the tether. The second fastener is configured to couple to the first fastener. The tether has a portion extending downwardly from the floating decoy. The portion is initially of a first length. The portion of the tether is operable to change to a different length when the second fastener is not coupled to the first fastener and is not operable to change to the different length when the second fastener is coupled to the first fastener.

14 Claims, 6 Drawing Sheets

(56) References Cited

U.S. PATENT DOCUMENTS

| | | | | |
|---|---|---|---|---|
| 5,899,014 | A * | 5/1999 | Bornhoft | A01M 31/06 43/3 |
| 7,475,509 | B2 * | 1/2009 | Cagle | A01M 31/06 43/3 |
| 2003/0061755 | A1 * | 4/2003 | McGhghy | A01M 31/06 43/3 |
| 2005/0022714 | A1 * | 2/2005 | Low | B63B 21/24 114/297 |
| 2006/0242883 | A1 * | 11/2006 | Tilby | A01M 31/06 43/3 |
| 2008/0155879 | A1 * | 7/2008 | Whipple | A01M 31/06 43/3 |
| 2008/0263930 | A1 * | 10/2008 | Siennan | A01M 31/06 43/3 |
| 2010/0011650 | A1 * | 1/2010 | Leonards, Sr. | A01M 31/06 43/3 |
| 2010/0115819 | A1 * | 5/2010 | Sieman | A01M 31/06 43/3 |
| 2012/0073181 | A1 * | 3/2012 | Loidolt | A01M 31/06 43/3 |
| 2013/0014423 | A1 * | 1/2013 | Tonkovich | A01M 31/06 43/3 |
| 2014/0208628 | A1 * | 7/2014 | McHugh | A01M 31/06 43/2 |
| 2014/0223798 | A1 * | 8/2014 | Paternostro | A01M 31/06 43/3 |
| 2014/0331542 | A1 * | 11/2014 | Andrews | A01M 31/06 43/3 |
| 2015/0208639 | A1 * | 7/2015 | Funderburg | A01M 31/06 43/3 |
| 2016/0106090 | A1 * | 4/2016 | Young | A01M 31/06 43/2 |
| 2016/0295853 | A1 * | 10/2016 | Evenson, III | A01M 29/06 |
| 2016/0324142 | A1 * | 11/2016 | Stirling | A01M 31/06 |
| 2018/0343851 | A1 * | 12/2018 | Runnebohm | A01M 99/00 |

* cited by examiner

DECOY ANCHOR SYSTEM

BACKGROUND OF THE DISCLOSURE

The present disclosure relates to hunting decoys, and more particularly, to a waterfowl decoy having an adjustable anchor system.

Waterfowl, such as ducks, geese, herons, swans, etc., tend to congregate in and around bodies of water such as lakes or ponds. Those who wish to hunt these waterfowl often utilize decoys that resemble their targets. These decoys are often placed in the bodies of water, where they float atop the surface. Each decoy generally has an anchor system to prevent the decoy from moving too far from a desired location (due to, e.g., waves or wind).

The anchor system of a prior art decoy typically has a tether that is of a fixed length and extends from a body of the decoy to the anchor system. The fixed length of the tether may render the prior art decoy unsuitable for bodies of water having different depths. The fixed length tether of prior art decoys may have an undesirable amount of slack in one body of water, and conversely, may not have enough length to allow the anchor system to reach the bottom of a different body of water. Additionally, the fixed length tethers of such prior art decoys may be prone to tangling, which may make storage of the decoys difficult.

Therefore, it would be desirable to have a decoy anchoring system that enables a tether having an anchor at its end to be lengthened or shortened easily and quickly so that the anchor is at just a correct distance to be adjacent and in contact with a bottom of a body of water.

SUMMARY OF THE DISCLOSURE

A decoy anchor system according to the present invention includes a floating decoy that includes a body portion having a bottom surface, the body portion having a shape configuration indicative of a waterfowl. The anchor system includes a tether mounting portion coupled to the bottom surface of the body portion and a flexible tether of elongate length being wound around the tether mounting portion and extending downwardly therefrom. A first fastener is fixedly attached to the floating decoy adjacent the tether mounting portion. A second fastener having a coupling portion is operably attached to the tether for movement therealong and an attachment portion selectively attached to the first fastener, wherein the tether is operable for unwinding from the tether mounting portion when the second fastener is not attached to the first fastener and is prevented from unwinding from the tether mounting portion when the second fastener is attached to the first fastener.

Therefore, a general object of this disclosure is to provide a decoy anchor system having a tether whose length is easily and quickly adjusted for length so that an anchor at the end of the tether may bear against the bottom of a body water while keeping the position of a duck decoy atop the water surface is maintained.

Another object of this disclosure is to provide a decoy anchor system, as aforesaid, that utilizes a pair of fasteners whose engagement or release from one another holds a tether in a current length position or is allowed to be adjusted, respectively.

Other objects and advantages of the present disclosure will become apparent from the following description taken in connection with the accompanying drawings, wherein is set forth by way of illustration and example, embodiments of this disclosure.

DESCRIPTION OF THE EMBODIMENTS

Figure 1:
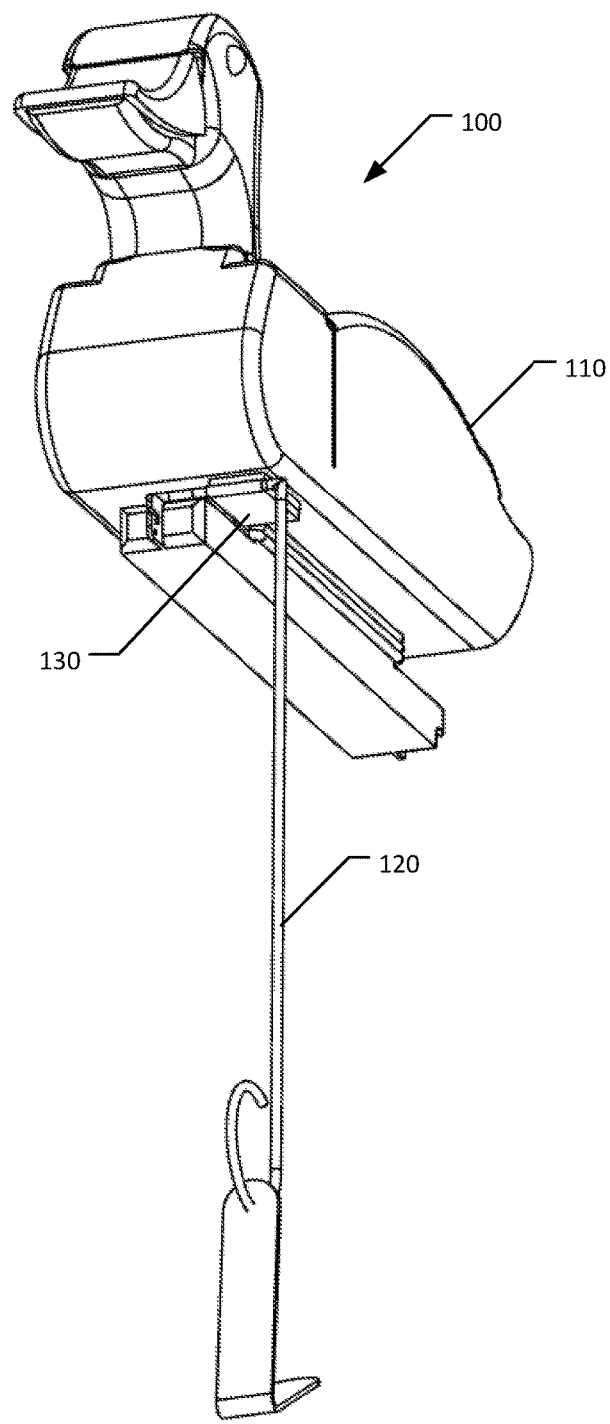
FIG. 1 shows a perspective view of a decoy anchor system.

A decoy anchor system 100 according to a preferred embodiment of the present invention will now be described with reference to FIGS. 1 to 6 of the accompanying drawings. The decoy anchor system 100 comprises a floating decoy 110, a tether 120, and fastening elements 130. FIG. 1 shows a decoy anchor system 100 according to an embodiment of the present disclosure.

Figure 2:
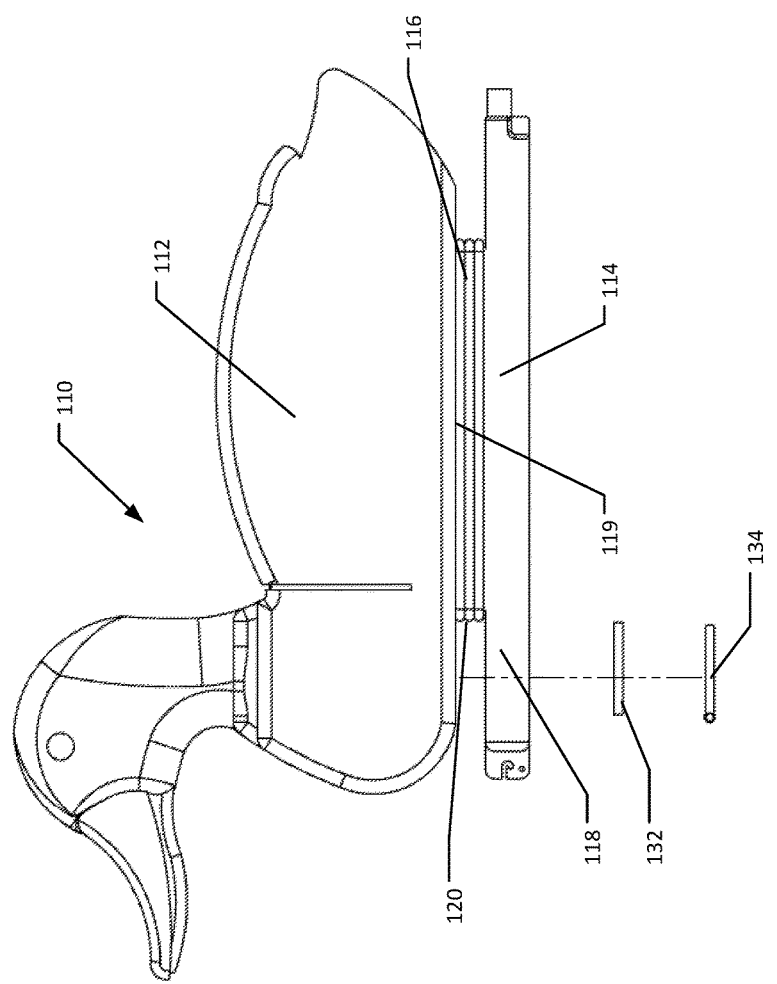
FIG. 2 shows a side view of a floating decoy of the decoy anchor system of FIG. 1.

FIG. 2 illustrates an example of the floating decoy 110. The floating decoy 110 may include a body portion 112 and a tether mounting portion 114. The body portion 112 may be manufactured to have a shape configuration indicative of a waterfowl, such as a duck, goose, heron, swan, etc. In some embodiments, the body portion 112 may be made of a buoyant material such as wood, plastic, foam, etc., and may be weighted with a heavier material to provide stability to the floating decoy 110. In operation, a majority of the body portion 112 may rest above a surface of a body of water, so as to be visible to any nearby waterfowl. The body portion 112 may in embodiments be painted, drawn upon, or decorated to give the body portion 112 the appearance of a live waterfowl.

The tether mounting portion 114 may be made of materials such as wood, metal, plastic, ceramic, a composite of these materials, etc. The tether mounting portion 114 may comprise a tether organizing portion 116 attached to a tether holding portion 118. The tether 120 may conveniently be wound or coiled around the tether organizing portion 116, and the tether holding portion 118 may prevent the tether 120 from undesirably slipping free from the decoy anchor system 100. For example, the tether holding portion 118 may be adjacent the tether organizing portion 116 and extend beyond the tether organizing portion 116 in one or more dimensions so as to prevent the tether 120 wound or coiled on the tether organizing portion 116 from slipping free from the floating decoy 110. The tether mounting portion 114 may be attached to a surface 119 of the body portion 112 (e.g. via adhesives, screws, nails, hook and loop fasteners, rope, etc.). In embodiments, the tether mounting portion 114 may be formed as part of the body portion 112. In operation, the tether mounting portion 114 may be generally submerged underwater while the body 112 may rest generally atop the water surface.

Figure 3:
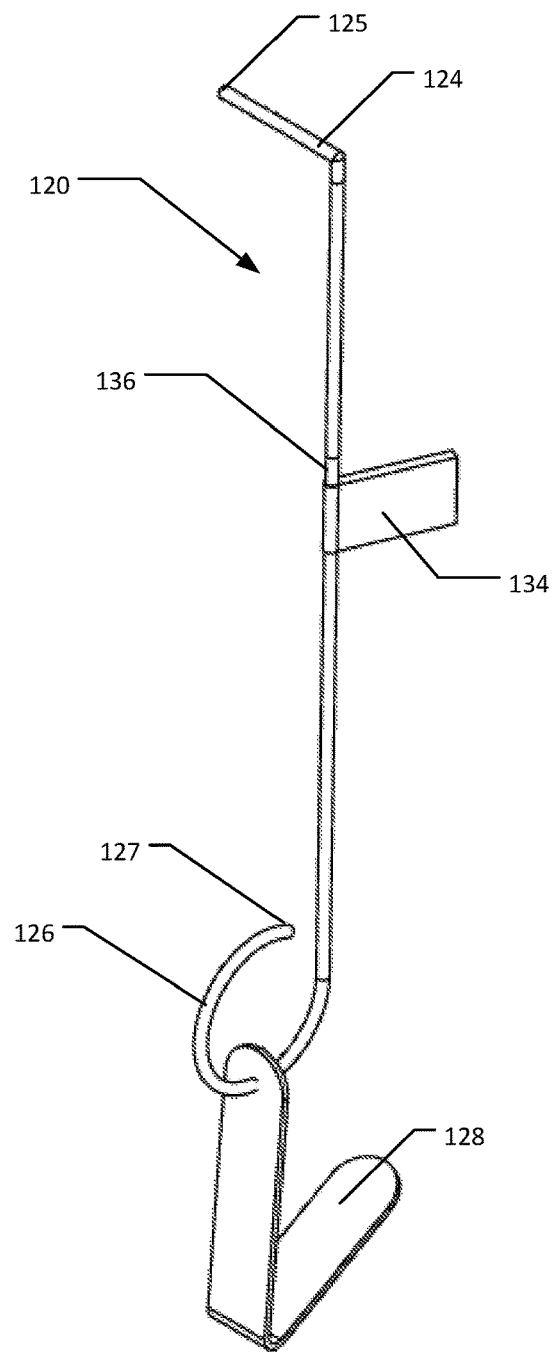
FIG. 3 shows a perspective view of a tether of the decoy anchor system of FIG. 1.

FIG. 3 illustrates an example of the tether 120. The tether 120 may include a proximal portion 124, a proximal terminal end 125, a distal portion 126, a distal terminal end 127, and an anchor 128. The tether 120 may be made of any suitable material such as natural fibers, synthetic fibers, metal, etc. The tether 120 may take the form of a rope, cord, string, strand, twine, braid, thread, cable, or other similar form. The proximal portion 124 may be wrapped, wound, or coiled around the tether mounting portion 114, or more specifically, the first portion 116 thereof. There may be a length 123 (see FIG. 4) of the tether 120 allowed to extend downwardly from the floating decoy 110. The proximal terminal end 125 may be attached to the body portion 112 and/or the tether mounting portion 114 so as to prevent the tether 120 from completely separating from the floating decoy 110.

Figure 4:
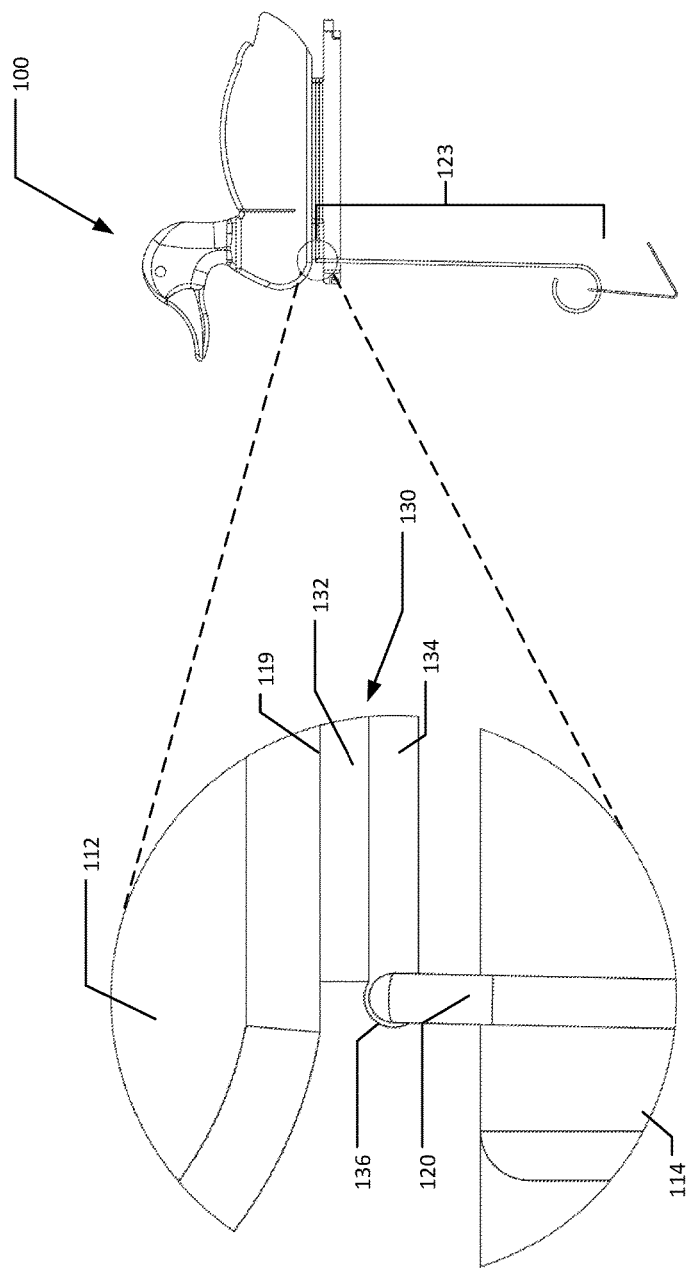
FIG. 4 shows a side view of the decoy anchor system of FIG. 1, illustrating a first fastener and a second fastener thereof.
Figure 5:
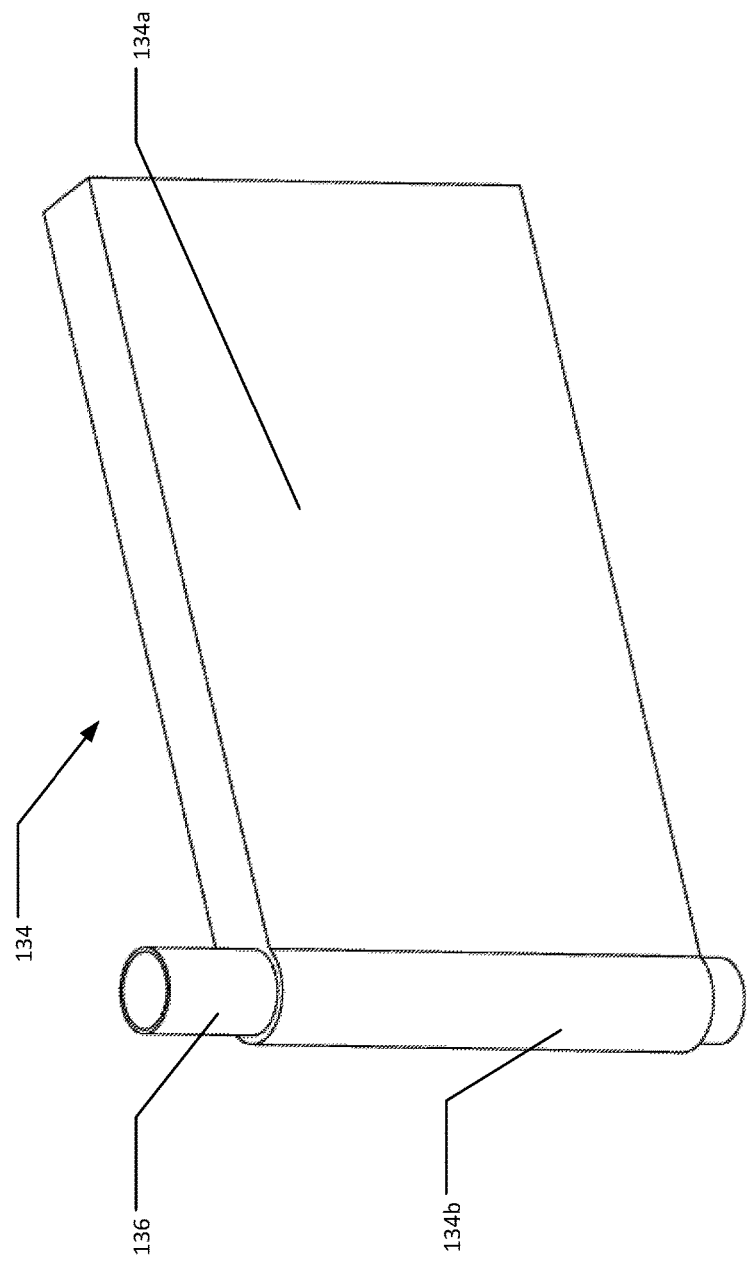
FIG. 5 shows a perspective view of the second fastener of FIG. 4.

The distal portion 126 may be removably or fixedly coupled to an anchor (or weighted part) 128. The anchor 128 may, but need not, be coupled directly to the distal terminal end 127. The anchor 128 may be made of a dense material so as to provide stability to the floating decoy 110 when the floating decoy 110 is floating in a body of water. Additionally, the anchor 128 may prevent excessive unwanted movement of the floating decoy 110 in the presence of wind or waves when the anchor 128 lies on the bottom surface of a body of water The fastening elements 130 may provide a method to adjust the length 123 of the tether 120. FIGS. 4 and 5 illustrate an example of the fastening elements 130. The fastening elements 130 may include a first fastener 132 and a second fastener 134. The first fastener 132 and the second fastener 134 may be configured to be coupled to each other. In an embodiment, the first fastener 132 and the second fastener 134 may be portions that make up a hook and loop fastener. As is known, a hook and loop fastener is generally made from two halves: one half containing a plurality of hooked members, the other half containing a plurality of looped members. When these two halves come into contact with each other the hooks may latch onto the loops of the other half, and the two halves may become thereafter difficult to separate. The fasteners may be attached, taken apart, and reattached repeatedly in this manner. In an embodiment, the first fastener 132 may include at least one of a hook portion and a loop portion, and the second fastener 134 may include at least one of a complementary hook portion and a complementary loop portion.

In other embodiments, the first fastener 132 and the second fastener 134 may comprise a button and loop system. The first fastener 132 may be a button, much like one that may be found on coats, pockets, bags, etc., which may be mounted to the floating decoy 110. The second fastener 134 may be a loop attached to the tether 120. The button and the loop may be removably coupled to each other by inserting the button within the loop. In another embodiment, the first fastener 132 and the second fastener 134 may comprise of one or more magnets. The magnets may be coupled together by bring their opposite poles together, thus creating a strong bond that may be coupled and uncoupled as desired. An advantage of the use of magnets as a first fastener 132 and a second fastener 134 is that the magnets suffer practically no degradation to their strength with repeated couplings and uncouplings.

The first fastener 132 may be fixedly attached to the floating decoy 110 (e.g., along the surface 119 of the body portion 112). In other embodiments, the first fastener 132 may be attached to the tether mounting portion 114 adjacent the tether organizing portion 116 where the tether 120 may be coiled, or at another suitable location. In still further embodiments, the first fastener 116 is attached proximate (e.g. within an inch) the tether mounting portion, as such may ensure that a majority of the tether 120 is usable to extend down from the floating decoy 110. The first fastener 132 may be fixedly attached through the use of adhesive, nails, screws, etc. The second fastener 134 may comprise an attachment area 134a (see FIG. 5) that contains a hook or a loop portion, and a coupling portion 134b. The coupling portion 134b may be coupled to a tube 136. In an embodiment, the coupling portion 134b may be an extension of the attachment portion 134a that is formed around the tube 136. The tube 136 may be of a generally hollow construction that may allow the tether 120 to run within it. With the tube 136 in place around the tether 120, the second fastener 134 may be operably for movement therealong. In other embodiments, the coupling portion 134b may be formed directly around the tether 120, so as to allow the coupling portion to slide along the tether 120.

In some embodiments, the coupling portion 134b may be attached to a clip. The attachment portion 134a may be attached to the coupling portion 134b in a similar manner as other embodiments. This clip may be movably coupled to the tether 120 by placing the tether 120 in between the clip, and the clip may be held in place by the clip's rigidity. An example of a clip may be a clothespin, binder clip, paper clip, etc.

Figure 6:
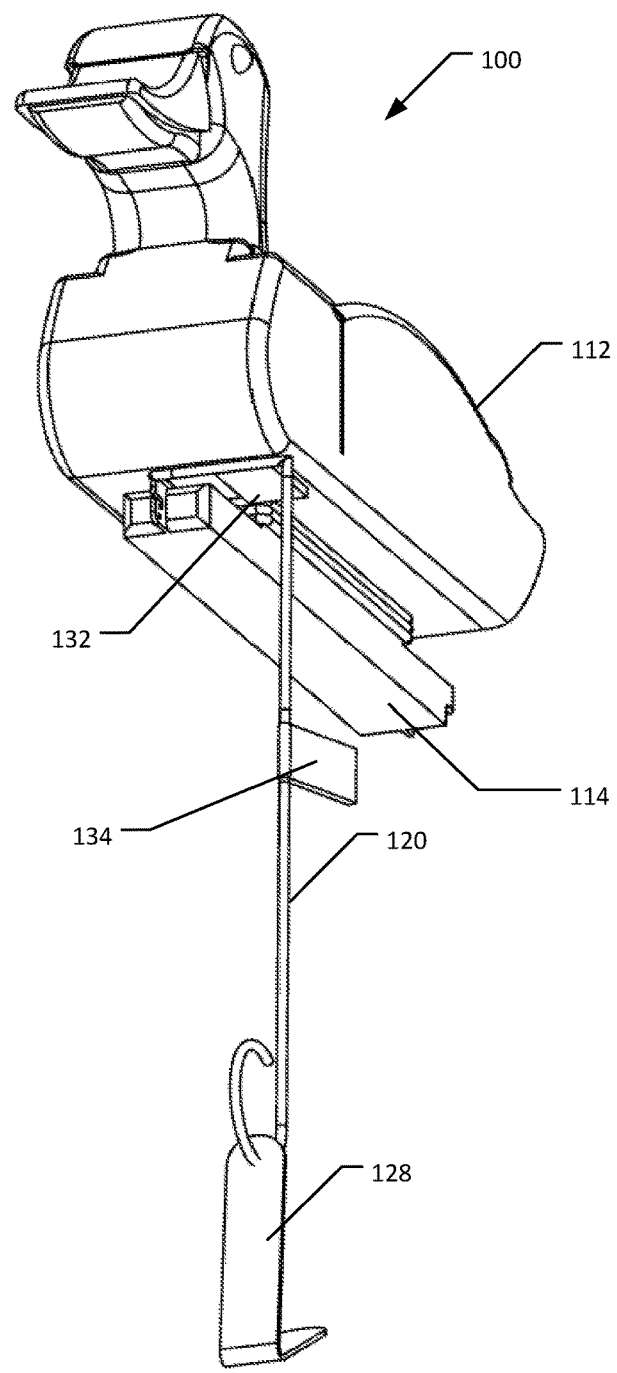
FIG. 6 shows another perspective view of the decoy anchor system of FIG. 1, illustrating the second fastener uncoupled from the first fastener.

After the second fastener 134 has been movably coupled to the tether 120, the first fastener 132 and the second fastener 134 may be removably coupled. The coupling of the first fastener 132 and the second fastener 134 may render the tether 120 unable to uncoil or unwind from the tether mounting portion 114, fixing for the time being the length 123 of the tether 120. If an increase or decrease in the length 123 of tether 120 is desired, then the first fastener 132 and the second fastener 134 may be uncoupled (as seen in FIG. 6) and the tether 120 may be either coiled or uncoiled to alter the desired length 123 of tether 120. Then the second fastener 134 may be moved, or slid, along the tether 120 and may reattach to the first fastener 132. When the tether is at the desired length, the first fastener 132 and the second fastener 134 may collectively prevent any further change in the length 123 of the tether 120. The depth of the anchor 128 of the floating decoy 110 may therefore be changed quickly and easily.

In some embodiments, fastening elements 130 may be applied, or retrofitted, to a preexisting decoy and a preexisting tether. The retrofitting may be effectuated by attaching the first fastener 132 to the preexisting floating decoy, and then coupling the second fastener 134 to the preexisting tether. The first fastener 132 and second fastener 134 may then perform their function on the preexisting floating decoy and the preexisting tether as they might with any other floating decoy 110 and tether 120.

It is understood that while certain forms of this disclosure have been illustrated and described, it is not limited thereto except insofar as such limitations are included in the following claims and allowable functional equivalents thereof.

The invention claimed is:

1. A decoy anchor system, comprising:
 a floating decoy that includes a body portion having a bottom surface, said body portion having a shape configuration indicative of a waterfowl;
 a tether mounting portion coupled to said bottom surface;
 a flexible tether of elongate length being wound around said tether mounting portion and extending downwardly therefrom;
 a first fastener fixedly attached to said floating decoy adjacent said tether mounting portion;

a second fastener having a coupling portion operably attached to said tether for movement therealong and an attachment portion selectively attached to said first fastener; and wherein said coupling portion has a tubular structure; and said tubular structure is configured to move slidably along said tether; and an anchor is coupled to a distal portion of said tether; and wherein said tether is operable for unwinding from said tether mounting portion when said second fastener is not attached to said first fastener and is prevented from unwinding from said tether mounting portion when said second fastener is attached to said first fastener.

2. The decoy anchor system of claim 1, wherein said attachment portion is fixedly attached to said coupling portion.

3. The decoy anchor system of claim 1, wherein said first fastener is at least one of a hook portion and a loop portion of a hook and loop fastener and said second fastener is at least one of a complementary hook portion and complementary loop portion of said hook and loop fastener.

4. The decoy anchor system of claim 1, wherein said anchor is removably coupled to said distal portion.

5. The decoy anchor system of claim 1, wherein said anchor is fixedly coupled to said distal portion.

6. The decoy anchor system of claim 1, wherein said first fastener is attached proximate said tether mounting portion.

7. A method for selectively adjusting a tether of a decoy anchor apparatus, the method comprising:
providing a floating decoy with a tether mounting part;
coupling said tether to said tether mounting part, said tether having a portion extending downwardly from said floating decoy, said portion initially being of a first length; coupling an anchor to said tether;
attaching a first fastener to said floating decoy;
movably coupling a second fastener to said tether via a slidable tube; and
allowing said second fastener to be coupled to said first fastener when said first length portion is changed to a second length.

8. The method of claim 7, wherein said first fastener and said second fastener are a hook and loop fastener.

9. A decoy anchor system having a floating decoy and a tether, comprising;
a first fastener attached to said floating decoy; and
a second fastener movably coupled to said tether, said second fastener being configured to couple to said first fastener; wherein said second fastener is coupled to said tether via a tubular structure, said tubular structure being configured to slidably move along said tether; and an anchor coupled to said tether;
wherein a portion of said tether extends downwardly from said floating decoy, said portion being initially of a first length; and
wherein said portion of said tether is operable for changing to a different length when said second fastener is not coupled to said first fastener and is not operable for changing to said different length when said second fastener is coupled to said first fastener.

10. The decoy anchor system of claim 9, wherein said first fastener is at least one of a hook portion and a loop portion of a hook and loop fastener and said second fastener is at least one of a complementary hook portion and complementary loop portion of said hook and loop fastener.

11. The decoy anchor system of claim 9, wherein said anchor is removably coupled to said tether.

12. The decoy anchor system of claim 9, wherein said anchor is fixedly coupled to said tether.

13. The decoy anchor system of claim 9, further comprising a tether mounting portion around which said tether is wound.

14. The decoy anchor system of claim 13, wherein said first fastener is attached to said floating body adjacent said tether mounting portion.

\* \* \* \* \*